April 18, 1933.　　　R. BERTHON　　　1,904,671
COPYING GOFFERED FILMS
Filed March 29, 1928
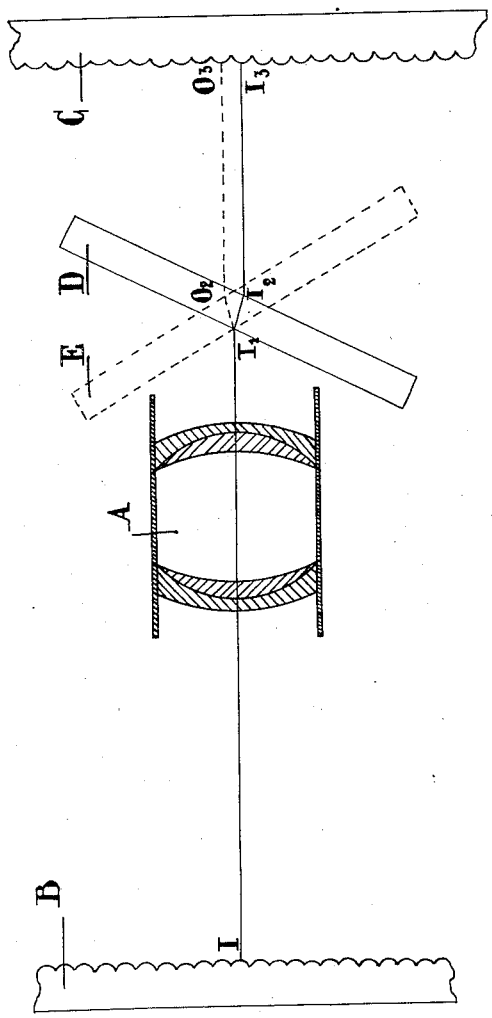
INVENTOR:
Rodolphe Berthon
BY
ATTORNEY Patented Apr. 18, 1933

1,904,671

UNITED STATES PATENT OFFICE

RODOLPHE BERTHON, OF NEUILLY, FRANCE, ASSIGNOR, BY MESNE ASSIGNMENTS, TO KISLYN CORPORATION, OF NEW YORK, N. Y., A CORPORATION OF DELAWARE

COPYING GOFFERED FILMS

Application filed March 29, 1928, Serial No. 265,667, and in France April 4, 1927.

Persons skilled in the art are aware that goffered films can be reproduced or copied without any difficulty whatever, provided the effect of "waterings" resulting from the optical superimposition of the network of lines or striations of the original film upon the network of the blank film is done away with by means of a suitable optical arrangement or device.

The object of the present invention is to effect obliteration of waterings by shifting the projection of the original film with respect to the positive film, said shifting being effected by means of any suitable optical or mechanical device and taking place during the period of illumination, with an amplitude limited to the width of one goffering striation. Due to this shifting, the optical coincidences are themselves shifted on the surface of the positive film during the whole time of exposure and, ultimately, can leave no residual image whatsoever on the film.

It will be readily realized that the invention can be carried out practically in a large number of different ways, the simplest of which consists in oscillating a blade having parallel faces and arranged on the projection beam, said blade rocking round a spindle parallel to the refracting striations, flutings or ribs of the film. The rocking in one direction corresponds to the aperture phase of the shutter, and the rocking in the opposite direction corresponds to the closure phase of said shutter.

The accompanying drawing shows a diagram representing a practical embodiment of the invention in which a parallel-faced blade is used.

In said drawing:

A is a camera or lens projecting the original film B upon a copy film C. D is a parallel-faced blade shown in full lines in its original position, the dotted-line position E being that which blade D assumes at the end of its rotation.

$I_1, I_2, I_3$ represent the optical axis of the system as deflected by the blade in its original position;

$I_1, O_2, O_3$ represent the optical axis as deflected by the blade when the latter is in position E.

The distance $I_3$—$O_3$ is equal to the width of one striation of the film.

If, in such conditions, there is, at any given moment of the exposure, coincidence between the lines of the two films, such coincidence will pass in a continuous manner from one striation to another during the exposure; waterings are therefore shifted and cannot become printed on the blank film.

The rocking of blade D is controlled by any suitable mechanical device—as, for instance, by a cam driven by the shaft of the shutter of the printing apparatus.

Of course, the same shifting of the axis of the system with respect to the positive film might be obtained by rocking the plane of the copying camera or lens. Also, the channel through which the film is moving might be rocked, said shifting being always, as will be obvious, of the same order of magnitude as the spacing of the striations (that is, practically 0,03 mm.).

I claim as my invention:

1. The method of eliminating moire in photographic reproduction from an original film on to a copy film, each of which has thereon a multiplicity of parallel minute lenticular elements, which comprises arranging the films with the elements on one parallel to those on the other, and projecting images from the original film on to the copy film while causing a continuous movement of the projected image transversely of said elements during substantially the entire time of exposure, said movement having an extent of the order of the width of one of said elements.

2. The method of eliminating moire in photographic reproduction from an original film on to a copy film, each of which has thereon a multiplicity of parallel minute lenticular elements, which comprises arranging the films with the elements on one parallel to those on the other, and projecting images from the original film on to the copy film while displacing a part of the projection system to cause a continuous movement of the projected image transversely of said elements during substantially the entire time of exposure, said movement having an extent of the order of the width of one of said elements.

In testimony whereof I affix my signature.

RODOLPHE BERTHON.